US009025492B2

(12) United States Patent
Cao

(10) Patent No.: US 9,025,492 B2
(45) Date of Patent: May 5, 2015

(54) TUNNEL MULTIPLEXING METHOD FOR LINEAR PROTECTION GROUP AND TAIL-NODE OF TUNNEL

(75) Inventor: Chaopeng Cao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 187 days.

(21) Appl. No.: 13/884,481

(22) PCT Filed: Jun. 8, 2011

(86) PCT No.: PCT/CN2011/075460
§ 371 (c)(1),
(2), (4) Date: May 9, 2013

(87) PCT Pub. No.: WO2012/062106
PCT Pub. Date: May 18, 2012

(65) Prior Publication Data
US 2013/0223285 A1  Aug. 29, 2013

(30) Foreign Application Priority Data
Nov. 12, 2010  (CN) .......................... 2010 1 0543063

(51) Int. Cl.
*H04L 12/28* (2006.01)
*H04L 12/24* (2006.01)
(Continued)

(52) U.S. Cl.
CPC ........ *H04L 41/0806* (2013.01); *H04L 12/4633* (2013.01); *H04L 12/4641* (2013.01); *H04L 45/22* (2013.01); *H04L 45/28* (2013.01); *H04L 45/50* (2013.01)

(58) Field of Classification Search
CPC ............ H04L 12/4633; H04L 12/4641; H04L 41/0806; H04L 45/28; H04L 45/50; H04L 45/22

USPC .................................................. 370/254, 433
See application file for complete search history.

(56) References Cited

U.S. PATENT DOCUMENTS 6,996,543 B1 * 2/2006 Coppersmith et al. .......... 705/50
7,197,008 B1 * 3/2007 Shabtay et al. ............... 370/218
(Continued)

FOREIGN PATENT DOCUMENTS

| CN | 101588296 | 11/2009 |
| CN | 101645836 | 2/2010 |

(Continued)

OTHER PUBLICATIONS

International Search Report for PCT/CN2011/075460, English translation attached to original, Both completed by the Chinese Patent Office on Aug. 4, 2011, All together 6 Pages.

*Primary Examiner* — Wanda Z Russell
(74) *Attorney, Agent, or Firm* — Brooks Kushman P.C.

(57) ABSTRACT

The present document relates to a tunnel multiplexing method for a linear protection group and a tunnel tail node. The method includes: setting linear protection configuration information, wherein a public network label is configured associatively with an active/standby status of its corresponding tunnel, and a private network label is configured associatively with an active/standby status of a valid tunnel of a protection group corresponding to the private network label; after receiving a data message, a tunnel tail node searching for active/standby status corresponding to the public network label and the private network label according to the public network label and the private network label in the data message, and judging whether the active/standby status corresponding to the public network label is consistent with the active/standby status corresponding to the private network label; if consistent, the tunnel tail node forwarding the data message, and if inconsistent, discarding the data message.

8 Claims, 3 Drawing Sheets

(51) Int. Cl.
  *H04L 12/46* (2006.01)
  *H04L 12/707* (2013.01)
  *H04L 12/703* (2013.01)
  *H04L 12/723* (2013.01)

(56) References Cited

U.S. PATENT DOCUMENTS

| | | | |
|---|---|---|---|
| 8,179,900 B2* | 5/2012 | Kitada | 370/395.53 |
| 2006/0013125 A1 | 1/2006 | Vasseur et al. | |
| 2009/0082016 A1* | 3/2009 | Bertagnole et al. | 455/433 |
| 2010/0098088 A1* | 4/2010 | Hirota | 370/395.5 |
| 2010/0309778 A1* | 12/2010 | Young | 370/219 |
| 2012/0182990 A1 | 7/2012 | Cao | |

FOREIGN PATENT DOCUMENTS

| | | |
|---|---|---|
| CN | 101662426 | 3/2010 |
| CN | 101984604 | 3/2011 |

* cited by examiner

TUNNEL MULTIPLEXING METHOD FOR LINEAR PROTECTION GROUP AND TAIL-NODE OF TUNNEL

CROSS-REFERENCE TO RELATED APPLICATIONS

This application is a U.S. national phase of PCT Application No. PCT/CN2011/075460 filed Jun. 8, 2011 which claims priority to Chinese Application No. 201010543063.3 filed Nov. 12, 2010, the disclosures of which are incorporated in their entirety by reference herein.

TECHNICAL FIELD

The present document relates to the field of communication, and especially, to a tunnel multiplexing method for a Multiprotocol Label Switching-Transport Profile (MPLS-TP) linear protection group and a tunnel tail node.

BACKGROUND OF THE RELATED ART

The MPLS-TP is a connection-oriented packet transport technology based on Multiprotocol Label Switching (MPLS) defined by the International Telecommunication Union Telecommunication Standardization Sector (ITU-T). An MPLS-TP data forwarding plane is a subset of the MPLS, data of the MPLS-TP data forwarding plane are forwarded based on MPLS-TP labels. The MPLS-TP is an application of the MPLS in a transport network, it simplifies certain complicated functions of the MPLS-TP data forwarding plane and increases functions such as connection-oriented Operation Administration and Maintenance (OAM) and recovery protection and so on.

Configurations of an MPLS-TP service are divided into two parts: a Virtual Private Network (VPN) part and an MPLS-TP tunnel part respectively; the VPN part is mainly used for accessing data messages of a private network user side to a public network tunnel side or accessing data messages of the public network tunnel side to the private network user side, we call a configuration close to the private network user side as a user side interface configuration, and it contains information of user access (such as an interface type and an interface content); and we call a configuration close to the public network tunnel side as a network side interface configuration, and it contains information such as a public network label list, a private network label list and a tunnel next hop.

Configurations of an MPLS-TP tunnel are on nodes, each node is a segment of the tunnel, which can be for egress and ingress, but not all the nodes have the egress and ingress; there is no ingress at the head of the tunnel (i.e. a head node), and the missing ingress is replaced with VPN access. Similarly, there is also no egress at the tail of the tunnel (i.e. a tail node), and the missing egress is also replaced with the VPN access.

When common data access a network side through a user side, they will be marked with a public network label and a private network label of the network side and forwarded to an opposite terminal device through the public network label in the network, and at the egress of the public network, that is, when the data access the user side from the network side, the public network label and private network label will be stripped, and the original data are restored and forwarded.

There are mainly two linear protection types of the MPLS-TP tunnel, which are respectively:

a protection type 1+1: a duplicator exists at the ingress of the tunnel (i.e. at the head node), a data message will be duplicated as two copies, one copy is sent to an active tunnel, the other copy is sent to a protection tunnel, and it is required to forward a valid message and discard an invalid message at the egress of the tunnel (i.e. at the tail node or tail end);

a protection type 1:1: a selector exists at the ingress of the tunnel, it will decide whether to send the data message through an active tunnel or through a standby tunnel; and it is also required to forward a valid message and discard an invalid message at the egress of the tunnel.

How to forward and discard the messages by the tunnel tail node is a considerable problem.

SUMMARY OF THE INVENTION

The technical problem required to be solved by the present document is to provide a tunnel multiplexing method for a linear protection group and a tunnel tail node, to implement multiplexing of standby tunnels.

In order to solve the above technical problem, the present document provides a tunnel multiplexing method for a linear protection group, which comprises:

setting linear protection configuration information, wherein a public network label is configured associatively with an active/standby status of a tunnel corresponding to the public network label, and a private network label is configured associatively with an active/standby status of a valid tunnel of a protection group corresponding to the private network label;

after receiving a data message, a tunnel tail node searching for an active/standby status corresponding to the public network label and an active/standby status corresponding to the private network label according to the public network label and the private network label in the data message, and judging whether the active/standby status corresponding to the public network label is consistent with the active/standby status corresponding to the private network label;

when determining that the active/standby status corresponding to the public network label is consistent with the active/standby status corresponding to the private network label, the tunnel tail node forwarding the data message, and when determining that the active/standby status corresponding to the public network label is inconsistent with the active/standby status corresponding to the private network label, discarding the data message.

Alternatively, the above method further comprises: when a protection group performs an active/standby tunnel switching, changing an active/standby status of a valid tunnel of a corresponding protection group in the linear protection configuration information.

Alternatively, the private network label is configured associatively with the active/standby status of the valid tunnel of the protection group corresponding to the private network label through a protection status index of the protection group.

Alternatively, in the linear protection configuration information, at least two protection groups share one standby tunnel.

In order to solve the above technical problem, the present document further provides a tunnel tail node, which comprises:

a configuration module, configured to: set linear protection configuration information, wherein a public network label is configured associatively with an active/standby status of a tunnel corresponding to the public network label, and a private network label is configured associatively with an active/standby status of a valid tunnel of a protection group corresponding to the private network label;

an active/standby status search judgment module, configured to: search for an active/standby status corresponding to the public network label and an active/standby status corresponding to the private network label according to the public network label and the private network label in the received data message, and judge whether the active/standby status corresponding to the public network label is consistent with the active/standby status corresponding to the private network label; and a data message processing module, configured to: when the active/standby status corresponding to the public network label is consistent with the active/standby status corresponding to the private network label, forward the data message, and when the active/standby status corresponding to the public network label is inconsistent with the active/standby status corresponding to the private network label, discard the data message.

Alternatively, when a protection group performs an active/standby tunnel switching, the configuration module is further configured to: change an active/standby status of a valid tunnel of a corresponding protection group in the linear protection configuration information.

Alternatively, the configuration module is configured to configure the private network label associatively with the active/standby status of the valid tunnel of the protection group corresponding to the private network label through a protection status index of the protection group.

Alternatively, in the linear protection configuration information set by the configuration module, at least two protection groups share one standby tunnel.

With the method and tunnel tail node of the present document, by associating the public network label with the active/standby status of the tunnel corresponding to the public network label and associating the private network label with the active/standby status of the valid tunnel of the protection group corresponding to the private network label, and through the active/standby status of the valid tunnel corresponding to the private network label, it is decided whether to discard messages sent through an active tunnel or discard messages sent through a standby tunnel, thereby implementing forwarding and discarding for the messages.

PREFERRED EMBODIMENTS OF THE INVENTION

With regard to the linear protection, no matter it is a 1+1 protection or a 1:1 protection, a tail end of a protection group (also called as a tail node) is required to select valid messages and invalid messages, and forward the valid messages, and discard the invalid messages at the same time. A method of combining a public network label entry and a private network label entry is adopted in the scheme, wherein a public network label is configured associatively with an active/standby status of a tunnel corresponding to the public network label, and a private network label is configured associatively with an active/standby status of a valid tunnel of a protection group corresponding to the private network label. It is decided whether the tunnel corresponding to the public network label is in an active status or a standby status through settings, and through the active/standby status of the valid tunnel corresponding to the private network label, it is decided whether to discard messages sent through an active tunnel or messages sent through a standby tunnel, thereby implementing forwarding and discarding for the messages.

The examples of the present document will be described in detail in combination with the accompanying drawings below. It should be noted that the examples in the present document and the characteristics in the examples can be combined with each other in the condition of no conflict.

Figure 1:
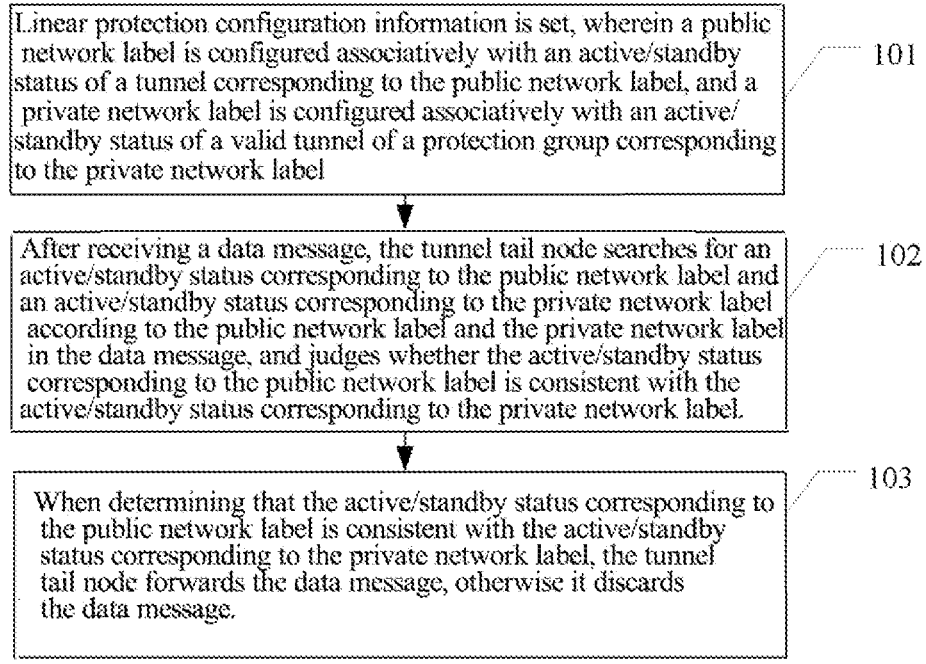
FIG. 1 is a schematic diagram of a linear protection method for an MPLS-TP tunnel according to the embodiment of the present document.

As shown in FIG. 1, a tunnel multiplexing method for a linear protection group according to the present document includes the following steps.

In step 101, linear protection configuration information is set, wherein a public network label is configured associatively with an active/standby status of a tunnel corresponding to the public network label, and a private network label is configured associatively with an active/standby status of a valid tunnel of a protection group corresponding to the private network label.

The public network label can be directly or indirectly configured associatively with an active/standby status of a tunnel corresponding to the public network label. Similarly, the private network label can be directly associated with the active/standby status of the valid tunnel of the protection group corresponding to the private network label, and also can be indirectly configured associatively with the active/standby status of the valid tunnel of the protection group corresponding to the private network label through a protection status index of the protection group.

In a traditional scheme, with regard to the linear protection group, one working tunnel corresponds to one protection tunnel, if a plurality of working tunnels are configured, a plurality of corresponding protection tunnels are required, which will go against network maintenance and causes waste of label resources.

Since private network tunnels and public network tunnels are in a one-to-one correspondence (it should be noted that, one public network tunnel can correspond to multiple private network tunnels, but one private network tunnel can correspond to only one public network tunnel), in order to reduce the waste of label resources, it is also configured that at least two working tunnels (i.e. active tunnels, also called as main tunnels) correspond to one protection tunnel (i.e. one standby tunnel) in the present document. Thus, the tail node is enabled to implement a selection decision through a table look-up judgment, thereby guarantying normal functions of a tail node, and meanwhile, implementing multiplexing of the standby tunnels, thus enhancing the utilization efficiency of label resources.

An example of the linear protection configuration information is given below.

A public network side egress, namely a tunnel tail node, has two VPN accesses: a VPN access 1 and a VPN access 2, wherein:

a private network label of the VPN access 1 is a PwLabel1, a main tunnel of a corresponding protection group Group1 is a Tunnel 1, and an ingress label of the main tunnel (i.e. a public network label) is a Label1; a standby tunnel is a Tunnel2, and an ingress label of the standby tunnel is Label2; during the initiation, valid tunnels of the Group1 are set to the Tunnel1;

a private network label of the VPN access 2 is a PwLabel2, a main tunnel of a corresponding protection group Group2 is a Tunnel3, and an ingress label of the main tunnel (i.e. a public network label) is a Label3; a standby tunnel is the Tunnel2; during the initiation, valid tunnels of the Group2 are set to the Tunnel3.

At the point, entries are described as follows:

a protection status index of the protection group Group1 corresponding to the VPN access 1 and private network label PwLabel1 is rr1;

a protection status index of the protection group Group2 corresponding to the VPN access 2 and private network label PwLabel2 is rr2;

an active/standby status flag curFlg of the valid tunnel corresponding to the Group1 protection status index rr1 is 0;

an active/standby status flag curFlg of the valid tunnel corresponding to the Group2 protection status index rr2 is 0;

an active/standby status flag Flag of the tunnel corresponding to the Tunnel1 ingress label Label1 index is 0;

an active/standby status flag Flag of the tunnel corresponding to the Tunnel3 ingress label Label3 index is 0;

an active/standby status flag Flag of the tunnel corresponding to the Tunnel2 ingress label Label2 index is 1;

The above Flag is an active/standby status flag of a tunnel, when the Flag is 0, it indicates a main tunnel, when the Flag is 1, it indicates a standby tunnel; the curFlg is an active/standby status flag of a valid tunnel, when the curFlg is 0, it indicates that the valid tunnel is a main tunnel, when the curFlg is 1, it indicates that the valid tunnel is a standby tunnel.

When the protection group performs active/standby tunnel switching, it is required to change the active/standby status of the valid tunnel of the corresponding protection group in the linear protection configuration information.

For example, when a human or a breakdown causes the active/standby switching in the Group1, and when switching is performed from the main tunnel Tunnel1 to the standby tunnel Tunnel2, Group1 protection status index rr1 is changed, and the corresponding curFlg is 1.

In step 102, after receiving a data message, the tunnel tail node searches for an active/standby status corresponding to the public network label and an active/standby status corresponding to the private network label according to the public network label and the private network label in the data message, and judges whether the active/standby status corresponding to the public network label is consistent with the active/standby status corresponding to the private network label.

In step 103, when determining that the active/standby status corresponding to the public network label is consistent with the active/standby status corresponding to the private network label, the tunnel tail node forwards the data message, and when determining that the active/standby status corresponding to the public network label is inconsistent with the active/standby status corresponding to the private network label, discards the data message.

Figure 2:
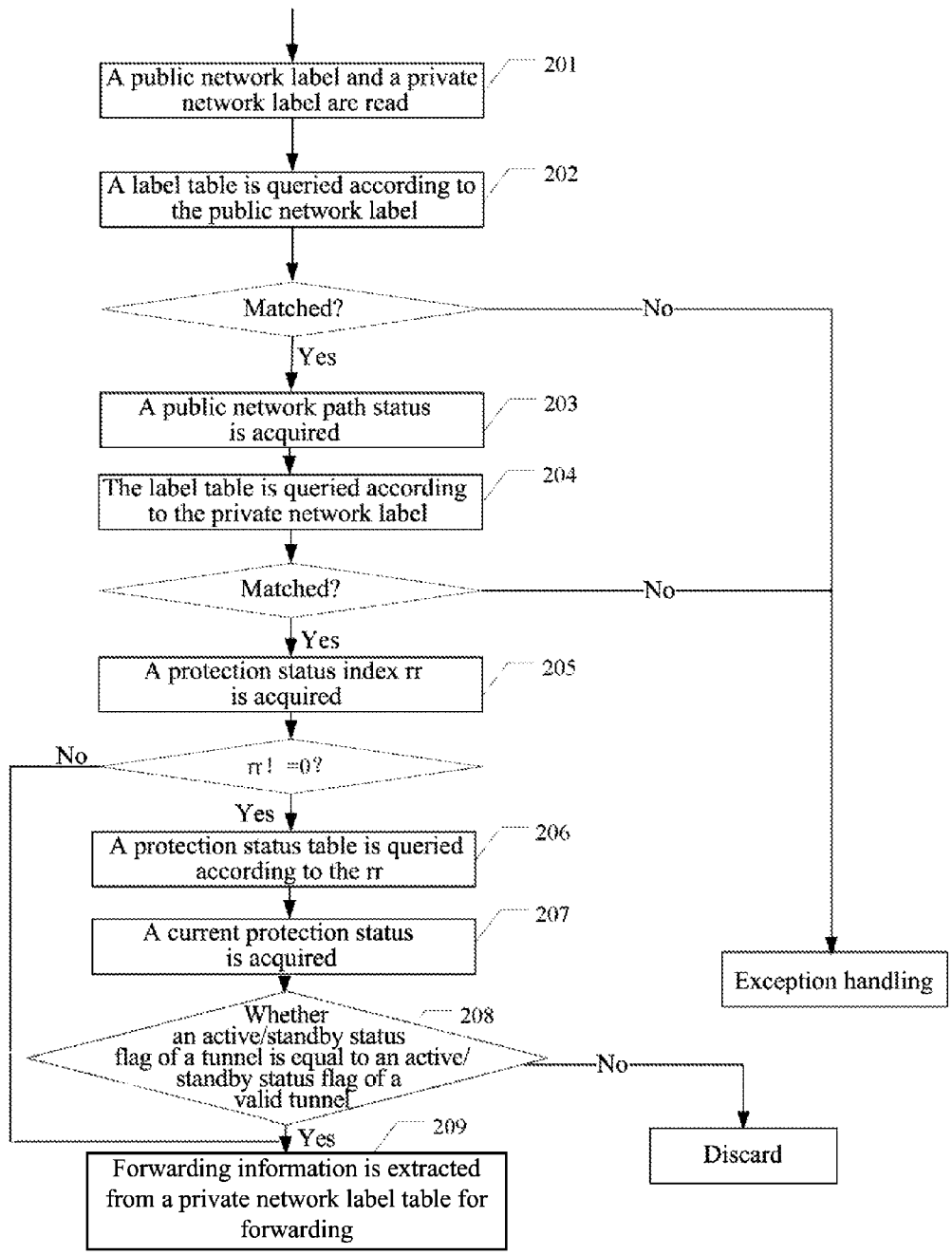
FIG. 2 is a schematic diagram of a processing flow after a tunnel tail node receives a data message according to the embodiment of the present document.

As shown in FIG. 2, a processing process after the tunnel tail node receives the data message includes the following steps.

In step 201, after receiving the data message from a network side, a public network label TunnelLabel and a private network label PwLabel in the data message are extracted.

In step 202, a label table is queried according to the public network label, and if no corresponding matching items exist, exception handling is performed.

In step 203, a Flag is acquired, if the Flag is 0, it indicates a corresponding tunnel is a main tunnel, and if the Flag is 1, it indicates that the corresponding tunnel is a standby tunnel.

In step 204, the label table is queried according to the private network label, and if no corresponding matching items exist, exception handling is performed.

In step 205, a protection group status index rr is acquired.

In step 206, if the rr is 0, that is, if no protection group is configured, it is to proceed to step 209 for processing, otherwise step 207 is executed.

In step 207, an index table is queried according to the protection group status index rr, a curFlg is acquired, if the curFlg is 0, it indicates that a valid tunnel is a main tunnel, and if the curFlg is 1, it indicates that the valid tunnel is a standby tunnel.

In step 208, if the Flag is equal to the curFlg, it is to proceed to step 209 for processing, otherwise the data message (also called as traffic) is discarded.

In step 209, forwarding information is extracted from a private network label table to perform data message forwarding.

According to the foregoing examples, by judging whether the Flag in the label table corresponding to the public network label is consistent with the curFlg in a protection status flag table corresponding to the protection status index in the private network label table, the tunnel tail node decides whether to discard the traffic or to continue to forward the traffic as follows:

if traffic sent from an opposite terminal to the VPN1 access is sent from the main tunnel, the public network label is Label1, and the private network label is PwLabel1; entries are queried, and if the Flag is 0 and the curFlg is 0, forwarding is performed;

if traffic sent from an opposite terminal to the VPN1 access is sent from the standby tunnel, the public network label is Label2, and the private network label is PwLabel1; entries are queried, and if the Flag is 1 and the curFlg is 0, discarding is performed;

if traffic sent from an opposite terminal to the VPN2 access is sent from the main tunnel, the public network label is Label3, and the private network label is PwLabel1; entries are queried, and if the Flag is 0 and the curFlg is 0, forwarding is performed;

if traffic sent from an opposite terminal to the VPN2 access is sent from the standby tunnel, the public network label is Label2, and the private network label is PwLabel1; entries are queried, and if the Flag is 1 and the curFlg is 0, discarding is performed;

if a Group1 status is to switch from the main tunnel to the standby tunnel artificially, a Group2 status keeps unchanged, and at the point, rewriting the entries is described as follows:

the curFlg in the status label table corresponding to the Group1 protection status index rr1 is 1;

after the active/standby switching of the Group1, by judging whether the Flag in the label table corresponding to the public network label is consistent with the curFlg in the protection status flag table corresponding to the protection status index in the private network label table, the tunnel tail node still decides whether to discard the traffic or to continue to forward the traffic as follows:

if the traffic sent from the opposite terminal to the VPN1 access is sent from the main tunnel, the public network label is Label1, and the private network label is PwLabel1; entries are queried, and if the Flag is 0 and the curFlg is 1, discarding is performed;

if the traffic sent from the opposite terminal to the VPN1 access is sent from the standby tunnel, the public network label is Label2, and the private network label is PwLabel1; entries are queried, and if the Flag is 1 and the curFlg is 1, forwarding is performed;

if the traffic sent from the opposite terminal to the VPN2 access is sent from the main tunnel, the public network label is Label3, and the private network label is PwLabel1; entries are queried, and if the Flag is 0 and the curFlg is 0, forwarding is performed;

if the traffic sent from the opposite terminal to the VPN2 access is sent from the standby tunnel, the public network label is Label2, and the private network label is PwLabel1; entries are queried, and if the Flag is 1 and the curFlg is 0, discarding is performed;

At the point, though the protection tunnel Tunnel2 is multiplexed and the Group1 status is inconsistent with Group2 status, normal functions can be implemented each other.

Figure 3:
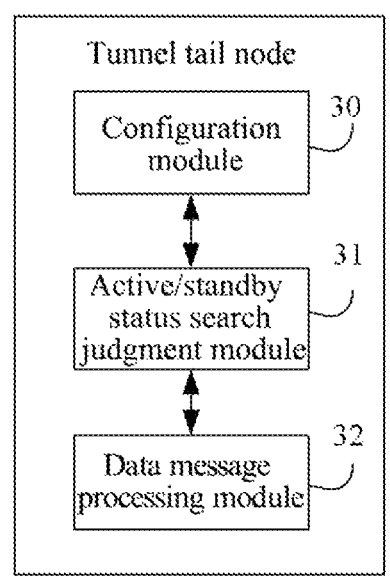
FIG. 3 is a schematic diagram of a module structure of an MPLS-TP tunnel tail node according to the embodiment of the present document.

In order to implement the above method, the present document also provides a tunnel tail node, and as shown in FIG. 3, the tunnel tail node includes:

a configuration module 30, configured to: set linear protection configuration information, wherein a public network label is configured associatively with an active/standby status of a tunnel corresponding to the public network label, and a private network label is configured associatively with an active/standby status of a valid tunnel of a protection group corresponding to the private network label;

when a protection group performs active/standby tunnel switching, the configuration module 30 changes an active/standby status of a valid tunnel of a corresponding protection group in the linear protection configuration information.

The public network label is directly or indirectly configured associatively with the active/standby status of the tunnel corresponding to the public network label. Similarly, the private network label is directly associated with the active/standby status of the valid tunnel of the protection group corresponding to the private network label, or it is configured associatively with the active/standby status of the valid tunnel of the protection group corresponding to the private network label through a protection status index of the protection group.

In the linear protection configuration information set by the configuration module 30, at least two protection groups share one standby tunnel.

An active/standby status search judgment module 31 is configured to: search for an active/standby status corresponding to the public network label and an active/standby status corresponding to the private network label according to the public network label and the private network label in the received data message, and judge whether the active/standby status corresponding to the public network label are consistent with the active/standby status corresponding to the private network label;

a data message processing module 32 is configured to: when the active/standby status corresponding to the public network label is consistent with the active/standby status corresponding to the private network label, forward the data message, and when the active/standby status corresponding to the public network label is inconsistent with the active/standby status corresponding to the private network label, discard the data message.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present document is not limited to any combination of hardware and software in a specific form.

INDUSTRIAL APPLICABILITY

In the present document, by configuring the public network label associatively with the active/standby status of the tunnel corresponding to the public network label and configuring the private network label with the active/standby status of the valid tunnel of the protection group corresponding to the private network label, and by comparing the active/standby status corresponding to the public network label and the active/standby status corresponding to the private network label in the received data message, the data message is processed. Furthermore, a protection tunnel also can be multiplexed, which enables multiple working tunnels to correspond to the same protection tunnel, thereby reducing the complexity of maintenance and network planning, and enhancing the utilization efficiency of label resources.

What is claimed is:

1. A tunnel multiplexing method for a linear protection group, comprising:

setting linear protection configuration information, wherein a public network label is configured associatively with an active/standby status of a tunnel corresponding to the public network label, and a private network label is configured associatively with an active/standby status of a valid tunnel of a protection group corresponding to the private network label;

after receiving a data message, a tunnel tail node searching for an active/standby status corresponding to the public network label and an active/standby status corresponding to the private network label according to the public network label and the private network label in the data message, and judging whether the active/standby status corresponding to the public network label is consistent with the active/standby status corresponding to the private network label;

when determining that the active/standby status corresponding to the public network label is consistent with the active/standby status corresponding to the private network label, the tunnel tail node forwarding the data message, and when determining that the active/standby status corresponding to the public network label is inconsistent with the active/standby status corresponding to the private network label, discarding the data message.

2. The method according to claim 1, further comprising: when a protection group performs active/standby tunnel switching, changing an active/standby status of a valid tunnel of a corresponding protection group in the linear protection configuration information.

3. The method according to claim 1, wherein: the private network label is configured associatively with the active/standby status of the valid tunnel of the protection group corresponding to the private network label through a protection status index of the protection group.

4. The method according to claim 1, wherein: in the linear protection configuration information, at least two protection groups share one standby tunnel.

5. A tunnel tail node, comprising:
- a configuration module, configured to: set linear protection configuration information, wherein a public network label is configured associatively with an active/standby status of a tunnel corresponding to the public network label, and a private network label is configured associatively with an active/standby status of a valid tunnel of a protection group corresponding to the private network label;
- an active/standby status search judgment module, configured to: search for an active/standby status corresponding to the public network label and an active/standby status corresponding to the private network label according to the public network label and the private network label in the received data message, and judge whether the active/standby status corresponding to the public network label is consistent with the active/standby status corresponding to the private network label; and
- a data message processing module, configured to: when the active/standby status corresponding to the public network label is consistent with the active/standby status corresponding to the private network label, forward the data message, and when the active/standby status corresponding to the public network label is inconsistent with the active/standby status corresponding to the private network label, discard the data message.

6. The tunnel tail node according to claim 5, wherein: when a protection group performs active/standby tunnel switching, the configuration module is further configured to: change an active/standby status of a valid tunnel of a corresponding protection group in the linear protection configuration information.

7. The tunnel tail node according to claim 5, wherein:
- the configuration module is configured to configure the private network label associatively with the active/standby status of the valid tunnel of the protection group corresponding to the private network label through a protection status index of the protection group.

8. The tunnel tail node according to claim 5, wherein: in the linear protection configuration information set by the configuration module, at least two protection groups share one standby tunnel.

* * * * *